(No Model.) 2 Sheets—Sheet 1.
G. D. BURTON.
APPARATUS FOR ELECTRICALLY HEATING METAL.
No. 576,545. Patented Feb. 9, 1897.
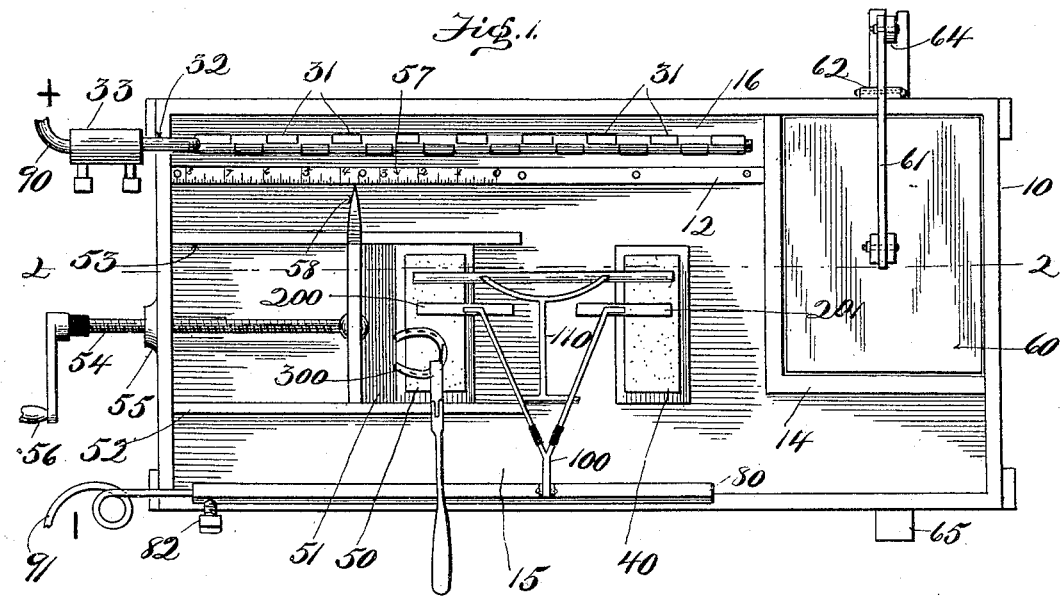
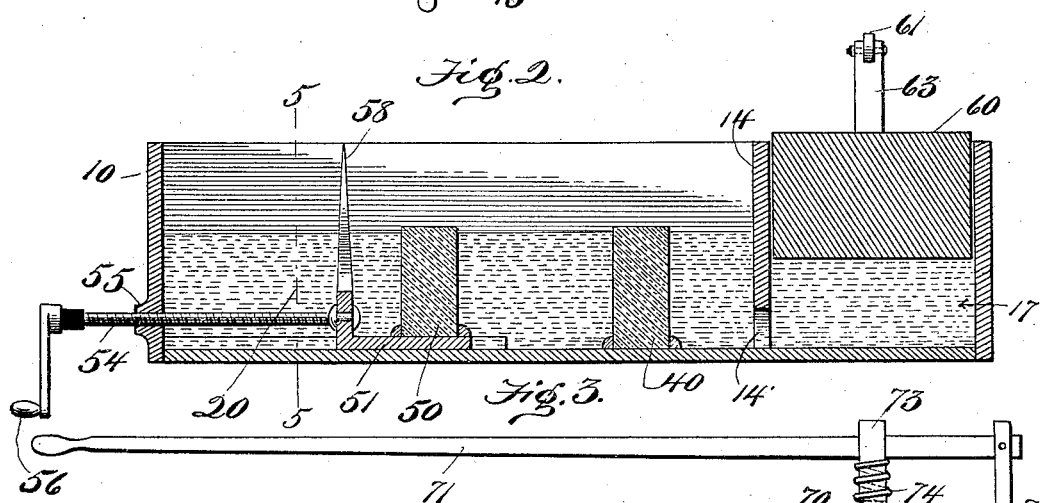
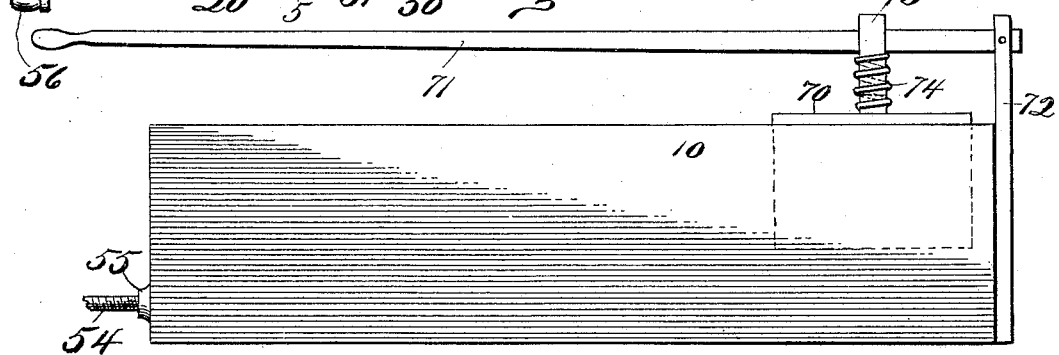
WITNESSES:
J. M. Fowler Jr
S. M. Dorsett
INVENTOR
G. D. Burton
BY J. C. Somes,
ATTORNEY.

(No Model.) 2 Sheets—Sheet 2.
G. D. BURTON.
APPARATUS FOR ELECTRICALLY HEATING METAL.
No. 576,545. Patented Feb. 9, 1897.
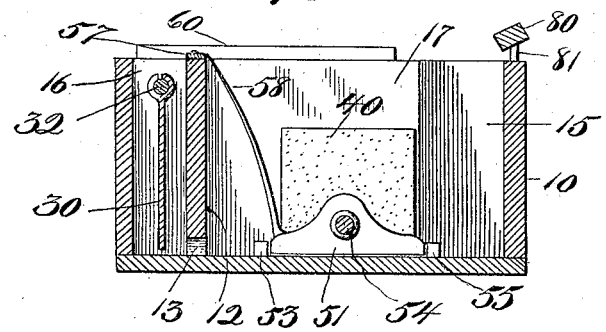
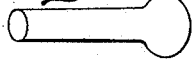
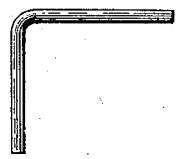
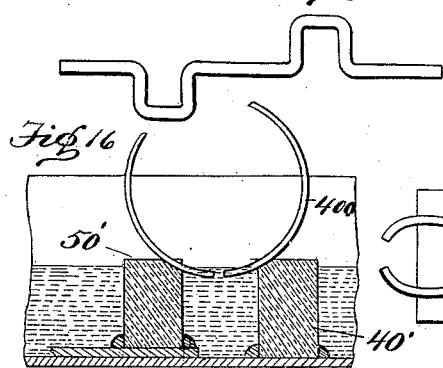
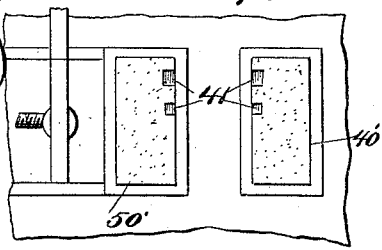
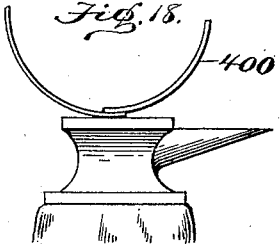
WITNESSES: INVENTOR
J. M. Fowler Jr. G. D. Burton
S. M. Dorsett BY J. C. Somes
ATTORNEY.

UNITED STATES PATENT OFFICE.

GEORGE D. BURTON, OF BOSTON, MASSACHUSETTS.

APPARATUS FOR ELECTRICALLY HEATING METAL.

SPECIFICATION forming part of Letters Patent No. 576,545, dated February 9, 1897.

Application filed March 30, 1895. Renewed July 7, 1896. Serial No. 598,362. (No model.)

*To all whom it may concern:*

Be it known that I, GEORGE DEXTER BURTON, a citizen of the United States of America, residing at Boston, in the county of Suffolk, in the State of Massachusetts, have invented certain new and useful Improvements in Apparatus for Electrically Heating Metal, of which the following is a specification.

This invention relates to an apparatus for heating metal to a forging, welding, or fusing heat by means of an electric or voltaic arc sprung between the metal and an electrolytic bath.

The object of the invention is to provide a simple, cheap, and convenient liquid forge especially adapted for heating any determinate lengths of bars or blanks of metal for use in machine-building or for forging into manufactured articles.

The invention consists in the combination of an electrolytic bath, a divided non-conductive hearth therein for supporting as electrodes the work to be heated, one member of the hearth being movable toward and from the other to vary the distance between them, means for effecting such movement, and means for establishing an electric arc between the solution and that portion of the electrode which spans the space between the parts of the hearth.

The invention consists, further, in the combination, with the elements above specified, of a gage for indicating the distance between the parts of the hearth, so that the hearth may be adjusted accurately at different times to heat work for corresponding lengths.

The invention consists, further, in the combination, with the electrolytic bath and electric conductors and hearth, of improved means for elevating and depressing the surface of the bath in relation to the surface of the hearth.

Figure 1 of the accompanying drawings represents a plan view of this apparatus. Fig. 2 represents a longitudinal vertical section thereof on line 2 2 of Fig. 1. Fig. 3 represents a side elevation thereof, showing the improved means for elevating and depressing the level of the liquid. Fig. 4 represents a detail of said means. Fig. 5 represents a transverse section of the apparatus on line 5 5 of Fig. 2. Fig. 6 represents a perspective view of a piece of work on which an enlargement or boss is formed at one end by heating the end in this bath and afterward upsetting or forging it. Fig. 7 represents a piece of angle-iron bent from a straight bar after being heated at the point where the angle is formed by resting the bar on the two members of the divided hearth and permitting the portion to be heated to come in contact with the bath between said members. Fig. 8 represents two electrodes of metal which have been heated by resting them on the divided hearth and letting their ends project over the liquid, whereby the ends are heated preparatory to the formation of a lap-joint. Fig. 9 represents the two electrodes of Fig. 8 welded together by a lap-joint. Fig. 10 represents a rod which has been rested on the two members of the hearth and heated between said members at its mid-length only and then bent at right angles. Fig. 11 represents a hook formed from a straight bar after the latter was heated in this bath. Fig. 12 represents two bars or electrodes which have been heated by this apparatus and joined together. Fig. 13 represents a double crank-shaft which is formed from a straight bar, the latter having been heated at the points of bending only by resting it upon the two members of the hearth and letting the parts to be heated extend between said members over the liquid, which is brought into contact with said parts. Fig. 14 represents a single crank-shaft formed from a straight bar which was heated between the members of the hearth while resting thereon. Fig. 15 represents a plan of a divided hearth composed of three members supporting the links of a chain which are heated for welding by being supported in contact with the liquid between said members. Fig. 16 represents a longitudinal section of this apparatus provided with a divided hearth, the edges of which have notches adapted to receive blanks for rings or tires for heating the ends preparatory to joining them. Fig. 17 represents a plan view of a divided hearth having notches for this purpose. Fig. 18 represents an anvil on which the ends of a tire blank are forged together by a lap-weld after said ends are heated in the bath.

The same reference-numerals indicate the same parts in all the figures.

A vessel 10, preferably in the form of a tank and constructed of or lined with a material which is a non-conductor of electricity, is designed to contain an electrolytic bath 20, through which an electric current is passed. If constructed of wood or earthenware, this vessel is coated on its inner surface with asphaltum or coal-tar in the same manner in which tanks for electroplating purposes are usually coated. Such a coating prevents the tank from absorbing the solution, and thereby avoids short-circuiting of the current through the walls of the tank, which might occur under a heavy voltage if such walls were saturated with the solution. This vessel when constructed as herein shown is provided with a longitudinal partition 12 near one side, said partition having openings 13 near its bottom or otherwise, and with a partition 14 having holes 14'. These partitions form a hearth-compartment 15, an anode-compartment 16, and a plunger-compartment 17, and the holes therein permit the solution to pass freely from one compartment of the tank to the others.

The bath 20 partially fills the vessel 10 and is composed of an electrolyte having a greater density than water and capable of evolving hydrogen. This bath may consist of a solution of chlorid of sodium of a density of 1.050 for small work, but when larger pieces of metal are to be heated the density is increased according to the size of the article to be heated. I have used for this purpose a solution of sodium carbonate or sal-soda of a specific gravity of 1.305 at 84° Fahrenheit; also a solution of equal parts of cream of tartar or potassium bitartrate of a specific gravity of 1.255 at 77° Fahrenheit; also a solution of water, carbonate of soda, and borax in the proportions of three parts of water to twelve pounds of carbonate of soda and one pound of borax.

An anode-plate 30 is disposed in the solution preferably in the anode-compartment 16 of the vessel 10. This anode is preferably composed of a lead plate serrated at its upper edge, forming lugs 31, which are bent in opposite directions and engage a copper rod 32, which extends over one end of the vessel and is provided with a binding-post 33 for connection with the positive conductor of an electric source. The location of the anode within the compartment 16 prevents contact of the work with the anode and avoids short-circuiting of the current thereby.

A divided hearth, composed of fire-clay or other non-conductive material, is supported in the vessel 10. One member 40 of this hearth is preferably adjusted in fixed position in a recess formed in the bottom of the tank. It is preferably provided with a smooth or flat surface at its top. The other member 50 of the divided hearth is supported in the bath on a movable slide 51, which moves between guideways 52 and 53 on the bottom of the tank. The member 50 may thus be adjusted toward or from the member 40 to increase or decrease the distance between said members and afford a greater or less span for electric contact of the bath with the work supported on the divided hearth, the arc being thus formed for a given length equal to the distance between said members. Suitable means are provided for adjusting the slides, such as a screw-rod 54, engaging a screw-threaded eye 55, in the end of the tank, said screw-rod being provided with an insulated handle 56 at its outer end.

A graduated scale 57 is disposed in proximity to the slide for the movable member of the hearth, preferably on the top of the partition 12 of the tank. The movable slide is provided with a pointer 58, which projects into reading contact with said graduated scale, whereby the distance between the two members of the divided hearth is indicated.

A plunger 60 is disposed in the plunger-compartment 16, and suitable means are provided for raising and lowering this plunger to raise and lower the level of the liquid in the hearth-compartment 15, so as to bring it into and out of contact with the metal supported on the divided hearth. This means, as shown in Figs. 1 and 2, consists of a lever 61, pivoted on a standard 62, attached to the rear of the tank and connected at its front end to a standard 63 on the plunger, a link 64, connected at its upper end to the rear end of said lever, and a pedal 65, which extends under the tank and is connected at its rear end with the lower end of said link.

The preferable means for actuating the plunger, as illustrated in Figs. 3 and 4, consists of a lever 71, pivoted at its rear end to a standard 72, attached to the rear end of the tank and extending forward over the top of said tank longitudinally thereof. The plunger 70 has a slotted standard 73, which is surrounded by a spring 74. The lever 71 rests in the slot of the standard 73 and on the spiral spring 74, and has a yielding connection with the plunger, so that when the lever is moved suddenly the plunger will move gradually, so as not to splash the liquid. When the lever is depressed, the plunger pushes down the liquid in the plunger-compartment and causes it to flow out through the openings in the partition 12 into the hearth-compartment, whereby the level of the liquid in the hearth-compartment is elevated to a level with or above the level of the divided hearth.

A terminal 80 in the form of a bar composed of copper or other suitable material is supported at the front side of the tank on insulated studs 81. One end of this bar is provided with a socket for receiving a conductor connected with the negative pole of the electric source and with a set-screw 82 for clamping the conductor in the socket. This bar is preferably beveled and serves as a rest on which the tool or implement for grasping the article to be heated may form contact for closing the circuit, or a bar or electrode to be heated in the bath of the hearth may be rested on this electrode and thereby be placed in circuit.

A positive conductor 90 is connected at one end with the anode-plate 30 and at the other end with the positive pole of the electric source. A conductor 91 is connected at one end to the terminal 80 and at the other end to the negative service-wire or negative pole of the dynamo or source of electric current.

An electrode 100 may be hinged or otherwise connected to the negative terminal 80 and form contact with an article on the hearth. This electrode may be forked and adapted to form contact separately with two articles on the hearth, and it may be provided also with an intermediate arm 110 and form contact with another article or articles on the hearth.

In the use of this apparatus for heating a bar for a definite length the two members 40 and 50 of the divided hearth are so adjusted relatively to each other as to be a distance apart equal to the length of the portion of the bar it is desired to heat, and the bar is adjusted with its ends resting on said members and its intermediate portion to be heated spanning the space between them. Then the negative electrode 100 is brought into contact with said bar or contact is made by any suitable means between the bar and the electrode 80. Then the plunger is depressed, and the level of the liquid in the hearth-chamber is elevated into contact with the bar, and an electric arc is formed between the liquid and that portion of the bar which spans the space between the two members of the hearth, whereby said portion is heated in a few seconds to the desired working heat.

In the use of the apparatus for heating two electrodes or bars of metal to be welded together by lap-joints the two bars, as 200 and 201, are placed on the two members of the divided hearth with their adjacent ends projecting over the hearth, and electric contact is effected by lowering the electrode 100 so that its outer end will touch both pieces, or in any other suitable manner, and then the level of the liquid is raised, as aforesaid, and those portions of the electrodes which are to be worked project beyond the inner edges of the members of the hearth, and arcs are formed between them and the solution, and they are heated quickly to the desired temperature. They may then be removed and welded or forged in any desired manner.

At the same time separate pieces of metal may be heated on the individual members of the hearth, as indicated in Fig. 1, where a horseshoe 300 is being heated on the movable member 50, electric contact being formed by the tool, which rests in part on the electrode 80 and in part on the horseshoe. The heel ends of the horseshoe are shown as projected over the hearth, and as the liquid rises it comes in contact with these ends an arc is formed between them and the solution. That portion of the shoe which rests flat on the hearth is not surrounded by an arc and is not heated. When the heel ends are sufficiently heated, the shoe is removed and said ends are turned up to form the calks.

In the use of the apparatus for the formation of a crank-shaft the members of the hearth are separated for a distance somewhat greater than the span of the crank to be formed and a rod is placed on said members spanning the space between them. That portion of the bar between the two members of the hearth is heated, as above described, and then bent in the desired form.

The members of the hearth may be of a height nearly on a level with the edge of the tank, in which case the normal level of the liquid is at a point just below the top of the hearth members.

In the use of the apparatus for welding the ends of tires or rings, as shown in Figs. 15 to 17, a blank ring or tire 400 is supported in notches 41 on the edges of the two members of the hearth in such a manner that the ends thereof are immersed in the liquid, which may be elevated or not, and these ends are then heated to a welding heat and united on an anvil or in any suitable manner.

The hearth may be formed of molded asbestos, if desired, which is preferable in the heating of files for tempering, as it does not injure the teeth or cutting edges of the files.

I claim as my invention—

1. In an electrolytic heating apparatus, the combination of a vessel for containing an electrolytic solution, a hearth composed of two members for supporting a metal to be heated, one of said members being movable relatively to the other, and means for moving one of said members relatively to the other.

2. In an electrolytic heating apparatus, the combination of a vessel for containing an electrolytic solution, a divided hearth composed of two members for supporting a metal to be heated, one of said members being movable relatively to the other, a gage for indicating the adjustment of the movable member, means for establishing an electric arc between the solution and the metal supported on the hearth, and electric conductors for connecting the solution and metal with opposite electric poles.

3. In an electrolytic heating apparatus, the combination of a vessel for containing an electrolytic solution, a divided hearth for supporting the metal to be heated, a slide for supporting one member of said hearth, means for adjusting said slide, and means for establishing an electric arc between the solution and the material supported on the hearth.

4. In an electrolytic heating apparatus, the combination of a vessel for containing an electrolytic solution, a divided hearth for supporting the metal to be heated, means for moving one member of said hearth relatively to the other member thereof, a forked electrode adapted for contact with work on both members of said hearth, and means for establishing an electric arc between the solution and the metal on the hearth.

5. In an electrolytic heating apparatus, the combination of a vessel for containing an electrolytic solution, a divided hearth for supporting the metal to be heated, means for moving one member of said hearth relatively to the other member thereof, an electrode provided with a plurality of arms of different lengths for contact with work on both members of said hearth, and means for establishing an electric arc between the solution and the metal on the hearth.

6. In an electrolytic heating apparatus, the combination of a vessel for containing an electrolytic solution, a hearth supported in said solution, a pump for elevating and depressing the level of the liquid in the hearth-compartment, a lever having a yielding connection with said pump, and means for establishing an electric arc between the solution and the metal on the hearth.

7. In an electrolytic heating apparatus, the combination of a vessel for containing an electrolytic solution, a hearth disposed in said solution for supporting the metal to be heated, a plunger-chamber communicating with the hearth-chamber, a plunger provided with a slotted standard, a pivoted lever for operating said plunger and engaging said slotted standard, a spring on said standard to effect a yielding contact between the lever and the plunger, and means for establishing an electric arc between the solution and the metal on the hearth.

GEO. D. BURTON.

Witnesses:
FRANCES JONES BURTON,
GEO. N. BLISS.